US011987153B2

(12) United States Patent
Lee et al.

(10) Patent No.: US 11,987,153 B2
(45) Date of Patent: May 21, 2024

(54) APPARATUS FOR ADJUSTING SEAT OF VEHICLE

(71) Applicants: HYUNDAI MOTOR COMPANY, Seoul (KR); KIA MOTORS CORPORATION, Seoul (KR); DAECHANG SEAT CO., LTD-DONGTAN, Hwaseong-si (KR); HYUNDAI TRANSYS INC., Seosan-si (KR)

(72) Inventors: Min Ju Lee, Hwaseong-si (KR); Seunghyun Kim, Daejeon (KR); Byung Yong Choi, Hwaseong-si (KR); Sanghyun Lee, Anyang-si (KR); Seon Chae Na, Yongin-si (KR); Chan Ki Cho, Gwangju (KR); In Chang Hwang, Hwaseong-si (KR); Donghwan Kim, Seoul (KR); Youngwoon Choi, Hwaseong-si (KR); Jaejin Lee, Hwaseong-si (KR)

(73) Assignees: HYUNDAI MOTOR COMPANY, Seoul (KR); KIA MOTORS CORPORATION, Seoul (KR); DAECHANG SEAT CO., LTD-DONGTAN, Hwaseong-si (KR); HYUNDAI TRANSYS INC., Seosan-si (KR)

( * ) Notice: Subject to any disclaimer, the term of this patent is extended or adjusted under 35 U.S.C. 154(b) by 549 days.

(21) Appl. No.: 17/191,197

(22) Filed: Mar. 3, 2021

(65) Prior Publication Data
US 2022/0111770 A1   Apr. 14, 2022

(30) Foreign Application Priority Data
Oct. 8, 2020   (KR) ........................ 10-2020-0129980

(51) Int. Cl.
*B60N 2/22*   (2006.01)
*B60N 2/015*   (2006.01)
(Continued)

(52) U.S. Cl.
CPC .......... *B60N 2/2209* (2013.01); *B60N 2/015* (2013.01); *B60N 2/02246* (2023.08);
(Continued)

(58) Field of Classification Search
CPC .. B60N 2/015; B60N 2/0224; B60N 2/02246; B60N 2/02253; B60N 2/04; B60N 2/065; B60N 2/12; B60N 2/2209; B60N 2/2213
(Continued)

(56) References Cited

U.S. PATENT DOCUMENTS

| 1,888,787 | A | * | 11/1932 | Carlson | ................ | B60N 2/2209 |
| | | | | | | 296/65.13 |
| 2,153,155 | A | * | 4/1939 | Page | .................... | B60N 2/3013 |
| | | | | | | 297/331 |

(Continued)

FOREIGN PATENT DOCUMENTS

| DE | 4031568 C1 | 4/1992 | | |
| DE | 102005023936 A1 | * | 11/2006 | ........... B60N 2/2209 |

(Continued)

*Primary Examiner* — Jason S Daniels
(74) *Attorney, Agent, or Firm* — MCDONNELL BOEHNEN HULBERT & BERGHOFF LLP (57) ABSTRACT

An apparatus for adjusting a seat of a vehicle includes a seat back frame, a cushion frame that is moved forward and backward by a motor driving unit, a cushion hinge part connecting the seat back frame and the cushion frame and rotating according to the movement of the cushion frame to adjust the angle of the seat back frame, and a seat back hinge part connecting the seat back frame and the vehicle body and rotating according to the movement of the seat back frame.

12 Claims, 11 Drawing Sheets

(51) Int. Cl.
  *B60N 2/02*   (2006.01)
  *B60N 2/06*   (2006.01)
  *B60N 2/12*   (2006.01)

(52) U.S. Cl.
  CPC ............... *B60N 2/065* (2013.01); *B60N 2/12* (2013.01); *B60N 2/02253* (2023.08)

(58) Field of Classification Search
  USPC ................................ 296/65.01, 65.15, 65.16
  See application file for complete search history.

(56) References Cited

U.S. PATENT DOCUMENTS

| | | | | |
|---|---|---|---|---|
| 3,184,209 | A * | 5/1965 | Colautti | B60N 2/02246 248/429 |
| 5,046,697 | A * | 9/1991 | Detloff | B60N 2/02246 248/419 |
| 7,270,371 | B2 * | 9/2007 | Adragna | B60N 2/3093 296/65.09 |
| 7,654,602 | B2 * | 2/2010 | Smiley | B66F 9/0759 297/14 |
| 10,065,536 | B2 * | 9/2018 | Poniatowski | B60N 2/43 |
| 2007/0273171 | A1 * | 11/2007 | Ito | B60N 2/02246 296/65.16 |
| 2008/0018155 | A1 * | 1/2008 | Smiley | B60N 2/24 297/341 |
| 2008/0211283 | A1 | 9/2008 | Okano et al. | |
| 2015/0165935 | A1 | 6/2015 | Sachs et al. | |
| 2017/0096086 | A1 | 4/2017 | Jeong et al. | |
| 2019/0315252 | A1 | 10/2019 | Kapusky et al. | |

FOREIGN PATENT DOCUMENTS

| | | | |
|---|---|---|---|
| DE | 102014225358 A1 | 6/2015 | |
| DE | 102016200539 A1 | 4/2017 | |
| DE | 102021004409 A1 * | 1/2022 | |
| FR | 2285260 A * | 5/1976 | ............ B60N 2/2209 |

* cited by examiner

APPARATUS FOR ADJUSTING SEAT OF VEHICLE

CROSS REFERENCE TO RELATED APPLICATIONS

This application claims priority to and the benefit of Korean Patent Application No. 10-2020-0129980 filed in the Korean Intellectual Property Office on Oct. 8, 2020, the entire contents of which are incorporated herein by reference.

BACKGROUND

(a) Field

The present disclosure relates to an apparatus for adjusting a seat of a vehicle. More particularly, the present disclosure relates to an apparatus for adjusting a seat of vehicle equipped with a motor drive unit in the vehicle's cushion frame, and a hinge structure applied to the cushion frame and seat back frame.

(b) Description of the Related Art

In order to achieve a comfortable seating posture for passengers, the seat back angle adjustment function using the slide function is applied to the rear seat of the existing luxury sedan.

However, in the mid-sized sedan, a fixed seat back is applied to the rear seat so that the seat back angle cannot be adjusted, which causes inconvenience to passengers during long distance driving.

Figure 1:
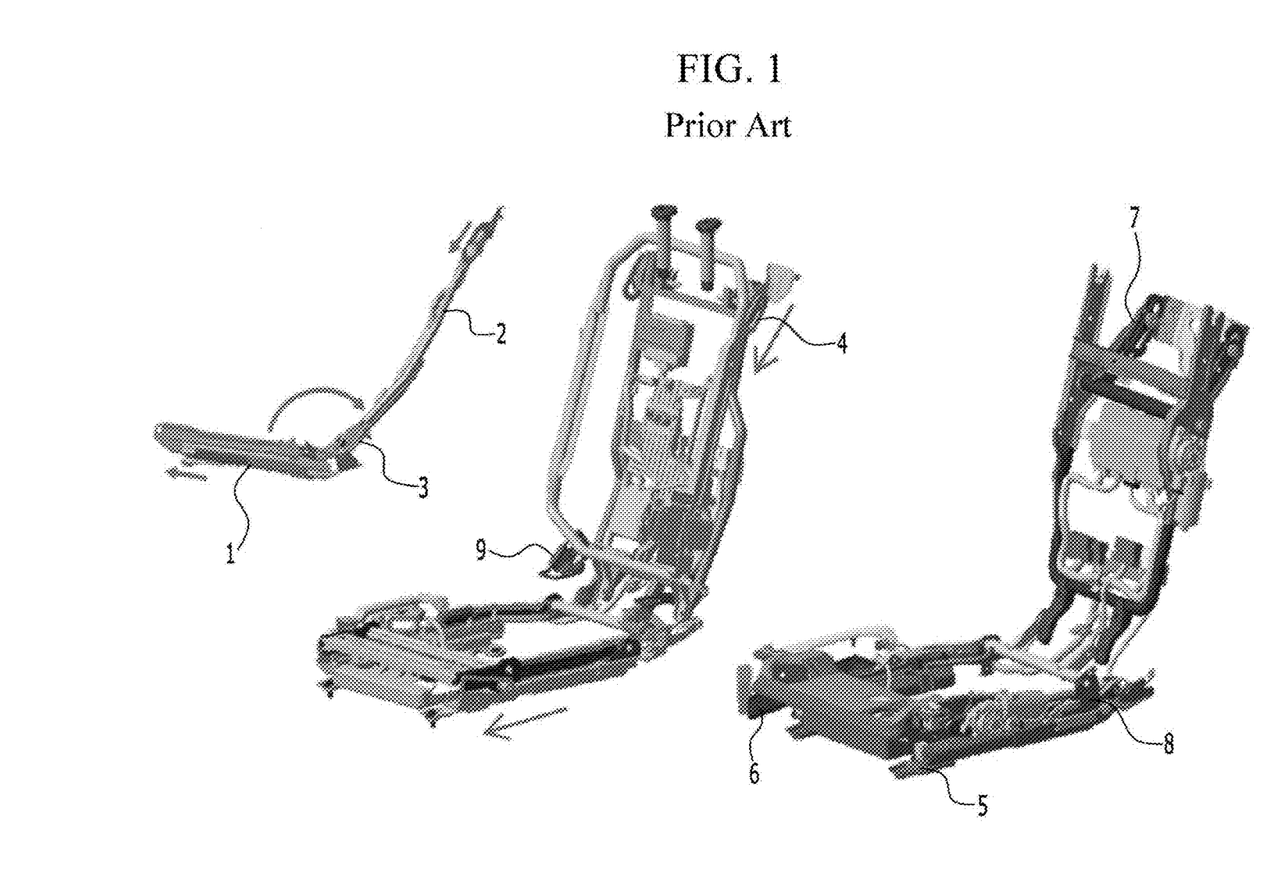
FIG. 1 is a diagram schematically showing a prior art apparatus for adjusting a seat of vehicle to which a conventional slide function is applied.

As shown in FIG. 1, in a mid-sized sedan, it is necessary to add an inner rail 5 and an outer rail 6 for sliding the seat back 2, a slot hole guide and a separate bracket 7 at the upper end of the seat back 2 for implementing the seat back 2 reclining function should be applied, and a separate mounting bracket 9 should be applied in addition to the hinge bracket 8 for connecting the cushion 1 and the seat back 2. Accordingly, the cost and material cost are increased and the weight is excessively increased.

Therefore, there is a need for research and development on a competitive vehicle seat control device through material cost and weight reduction.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide an apparatus for adjusting a seat of vehicle with a simple structure that can reduce cost and weight compared to the existing structure, to increase marketability and provide a comfortable ride.

An apparatus for adjusting a seat of a vehicle according to an exemplary embodiment of the present disclosure includes a seat back frame, a cushion frame that is moved forward and backward by a motor driving unit, a cushion hinge part connecting the seat back frame and the cushion frame and rotating according to the movement of the cushion frame to adjust the angle of the seat back frame, and a seat back hinge part connecting the seat back frame and the vehicle body and rotating according to the movement of the seat back frame.

The motor driving unit may include a motor, a worm gear connected to a motor shaft and rotated, and a rack gear meshed with the worm gear to convert rotational motion of the worm gear into linear motion.

The motor driving unit may include a leg bracket formed by penetrating the first slot hole on the side surface, a motor bracket coupled to an outer portion of the motor and covering the worm gear and the rack gear, and a guide bracket provided above the leg bracket, formed through a second slot hole, and inserted into a slot pin of the motor bracket to move the motor bracket.

The rack gear may be fixed by welding to the upper end of the guide bracket.

The cushion frame may be connected to the motor shaft, extends toward an inner end of the vehicle facing the motor bracket, and further include a frame shaft that is inserted and moved into the first slot hole.

A worm gear may be provided at an inner end of the vehicle facing the motor shaft of the frame shaft, and the worm gear may be rotated by meshing with a rack gear that converts rotational motion of the worm gear into linear motion.

The motor driving unit may further include a rail providing a path through which the motor bracket is moved along the leg bracket.

A bearing may be posted and coupled between the lower outer portion of the motor bracket and the inner portion of the rail.

The leg bracket may be welded to the vehicle body to support the lower end of the cushion frame.

The cushion hinge part may include a cushion bracket surrounding the cushion frame so that the cushion frame is rotated, and a seat back bracket connecting the cushion bracket and the seat back frame.

The cushion hinge part may further include a cushion bush provided inside the cushion bracket and rotated with the rotation of the cushion frame.

The cushion bracket and the seat back bracket may be hingedly coupled to each other by a pin.

The seat back hinge part may include a seat back wire, a seat back bush that surrounds the seat back wire so that the seat back wire rotates, and a hook fixed to the vehicle body and supporting the seat back bush.

The hook may be formed of a steel material, and the seat back bush may be formed of a plastic material.

The seat back bush may include a first seat back bush and a second seat back bush that are coupled to each other to surround the seat back wire.

According to an exemplary embodiment of the present disclosure, by providing a vehicle seat adjustment device with a simple structure, cost and weight can be reduced compared to the existing reclining structure.

In addition, since the seat back angle can be adjusted, it is possible to implement a comfortable seating posture for passengers during long-distance driving, to improve customer satisfaction.

In addition, by applying a seat bag that can be rotated according to the movement of a cushion frame instead of a fixed seat bag in a mid-sized sedan to adjust the angle, marketability can be increased by implementing a seat back angle adjustment function in a mid-sized sedan.

DETAILED DESCRIPTION

Hereinafter, the present disclosure will be described more fully with reference to the accompanying drawings, in which exemplary embodiments of the disclosure are shown. As those skilled in the art would realize, the described embodiments may be modified in various different ways, all without departing from the spirit or scope of the present disclosure.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present disclosure shows an exemplary embodiment of the present disclosure in detail. As a result, various modifications of the drawings will be expected. Therefore, the exemplary embodiment is not limited to a specific aspect of the illustrated region, and for example, includes modifications of an aspect by manufacturing.

Now, an apparatus for adjusting seat of vehicle according to an exemplary embodiment of the present disclosure will be described with reference to FIG. 2 to FIG. 10.

Figure 2:
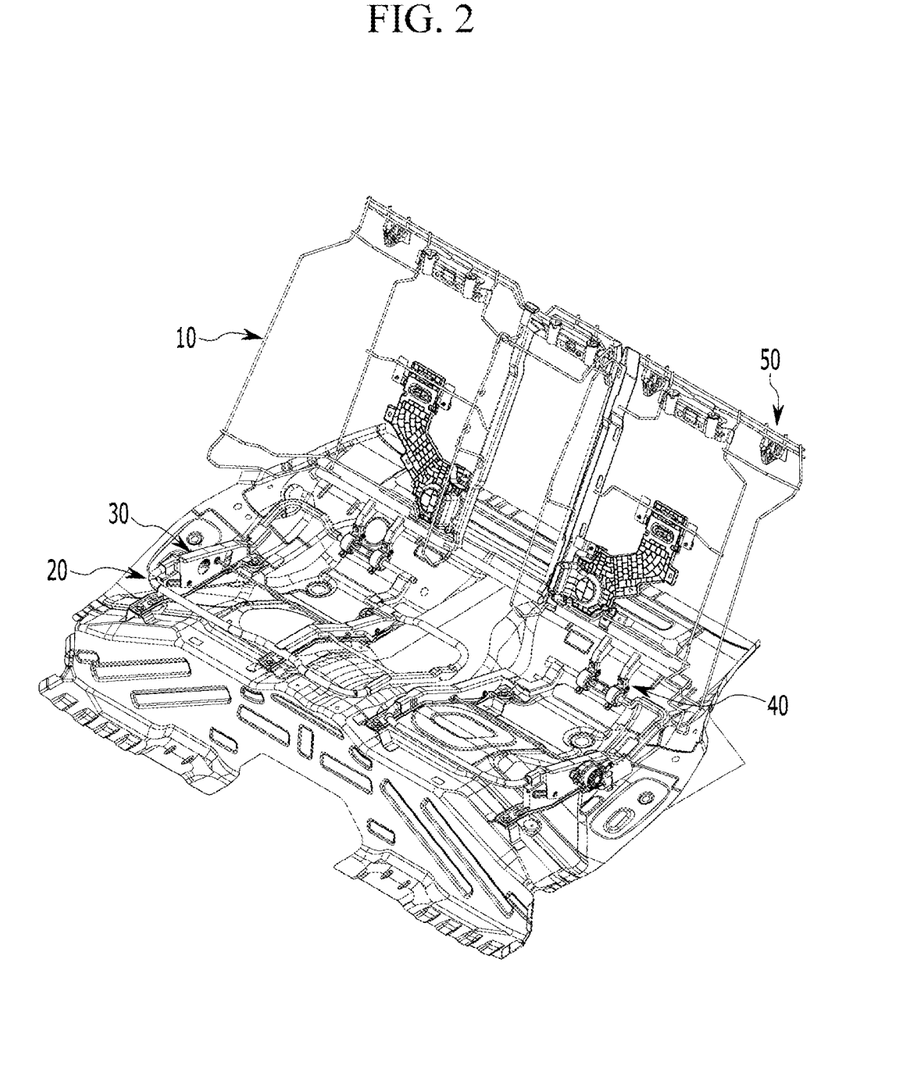
FIG. 2 is a diagram schematically showing an apparatus for adjusting a seat of a vehicle according to an exemplary embodiment of the present disclosure.
Figure 3:
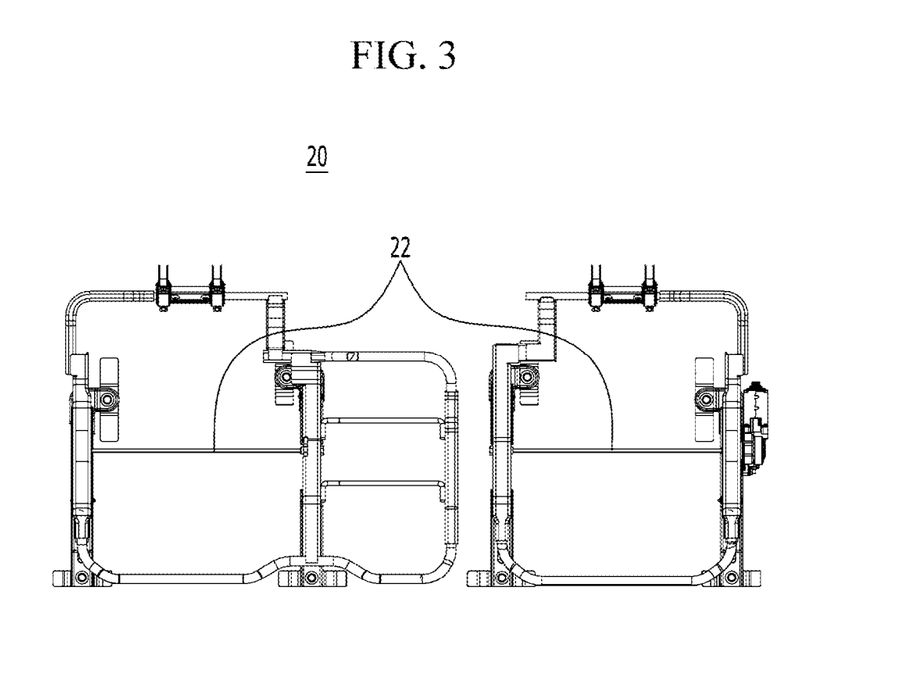
FIG. 3 is a view schematically showing the structure of a seat back frame according to an exemplary embodiment of the present disclosure.
Figure 4:
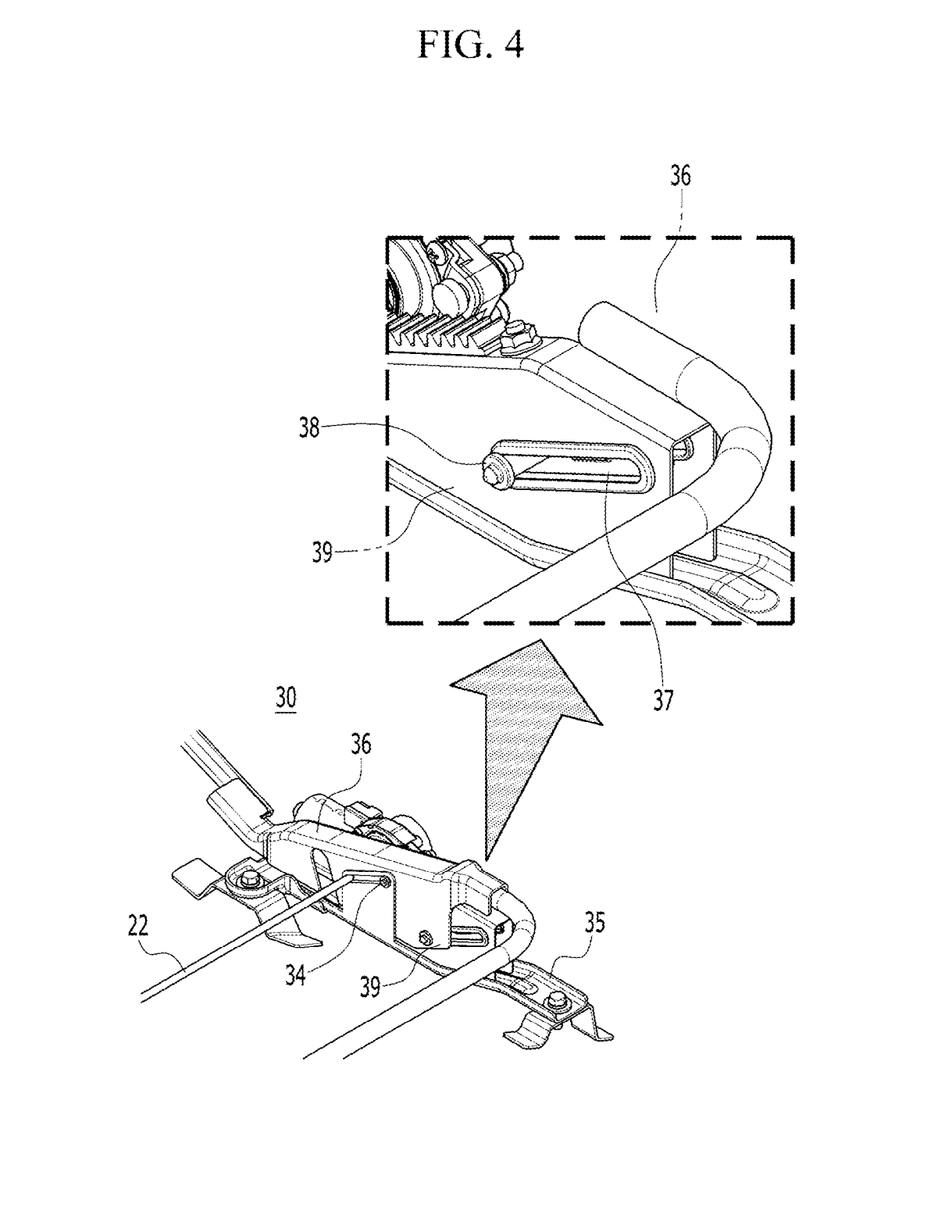
FIG. 4 is a view schematically showing a motor driving unit and a bracket structure applied to a seat back frame according to an exemplary embodiment of the present disclosure.
Figure 5:
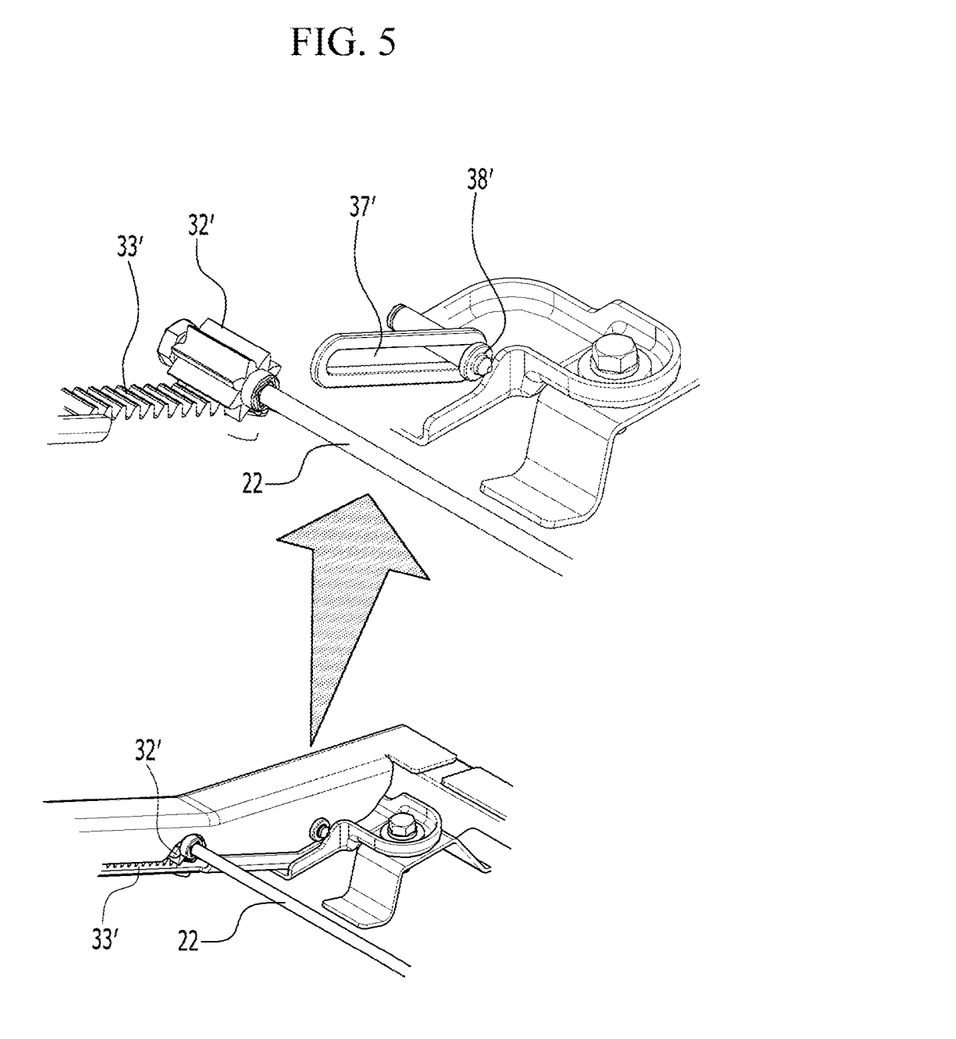
FIG. 5 is a diagram schematically showing a gear combination structure provided at a position facing the motor driving unit according to an exemplary embodiment of the present disclosure.
Figure 6:
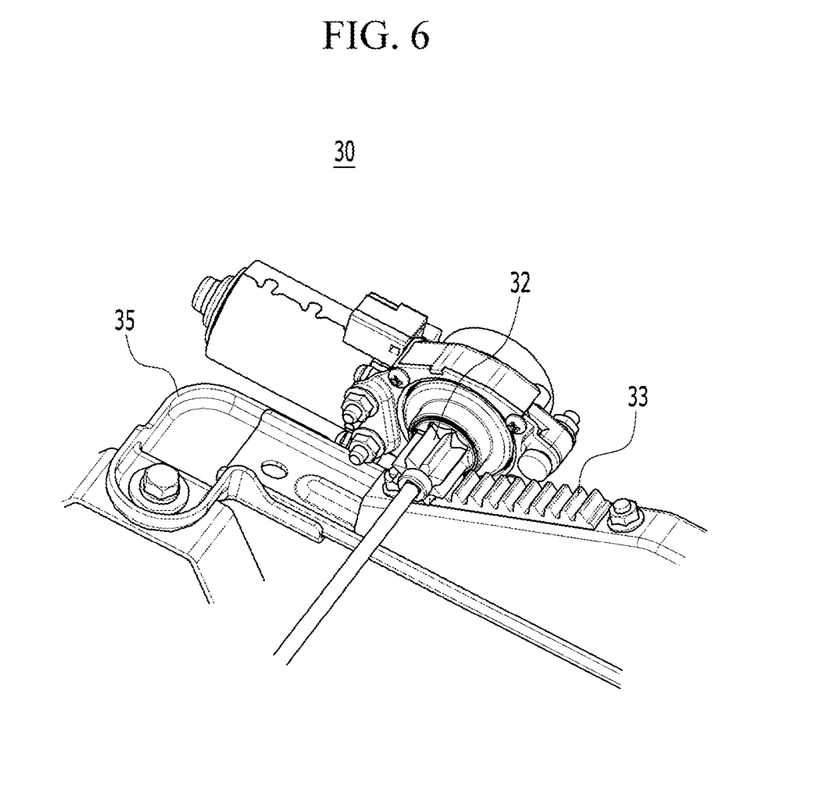
FIG. 6 is a diagram schematically showing a gear combination structure of a motor drive unit according to an exemplary embodiment of the present disclosure.
Figure 7:
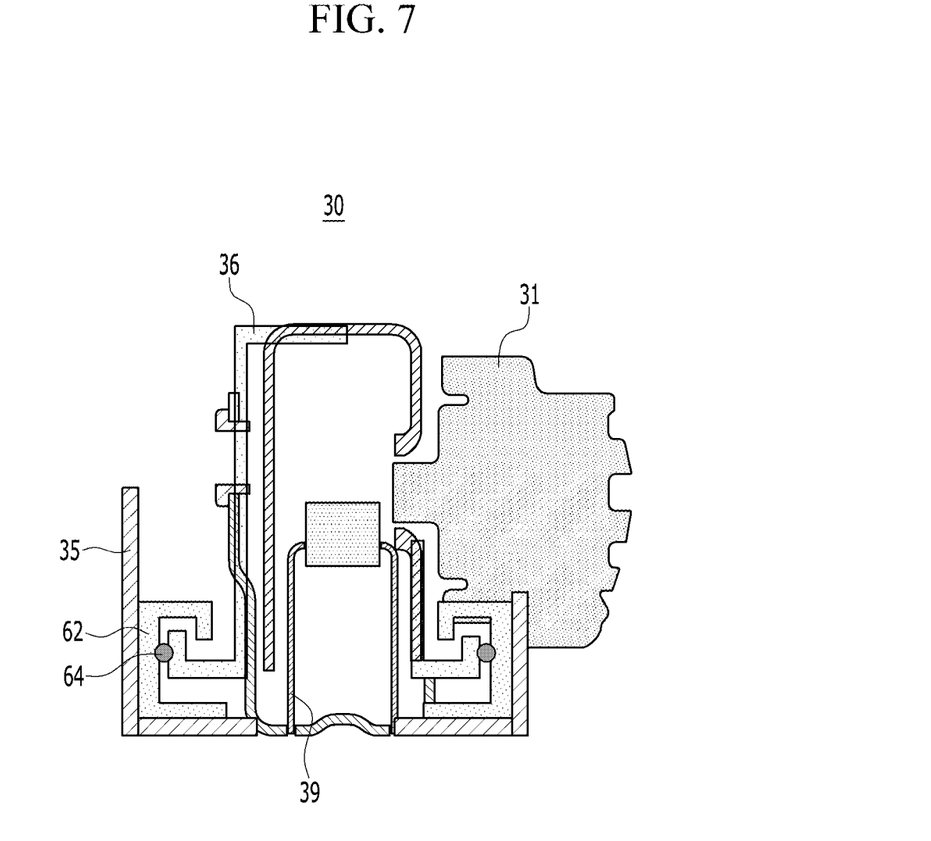
FIG. 7 is a view schematically showing a coupling structure of a bracket and a rail according to an exemplary embodiment of the present disclosure.
Figure 8:
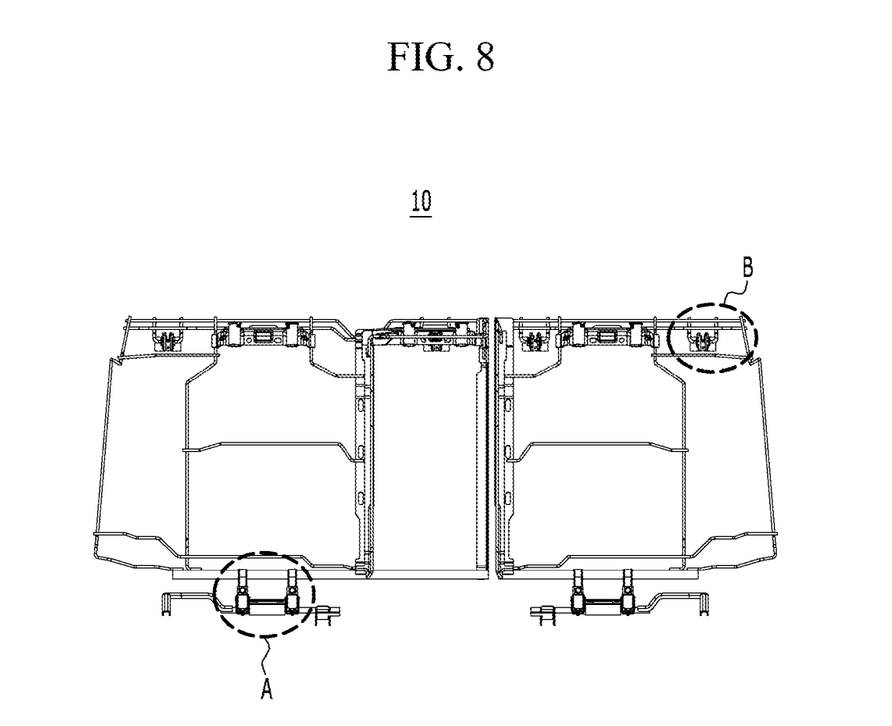
FIG. 8 is a diagram schematically showing the structure of a seat back frame according to an exemplary embodiment of the present disclosure.
Figure 9:
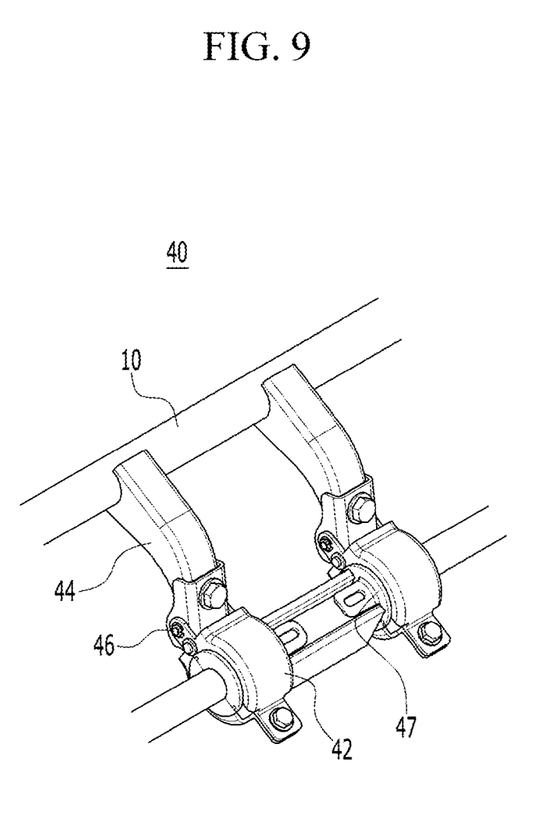
FIG. 9 is a view schematically showing the structure of a cushion hinge according to an exemplary embodiment of the present disclosure.
Figure 10A:
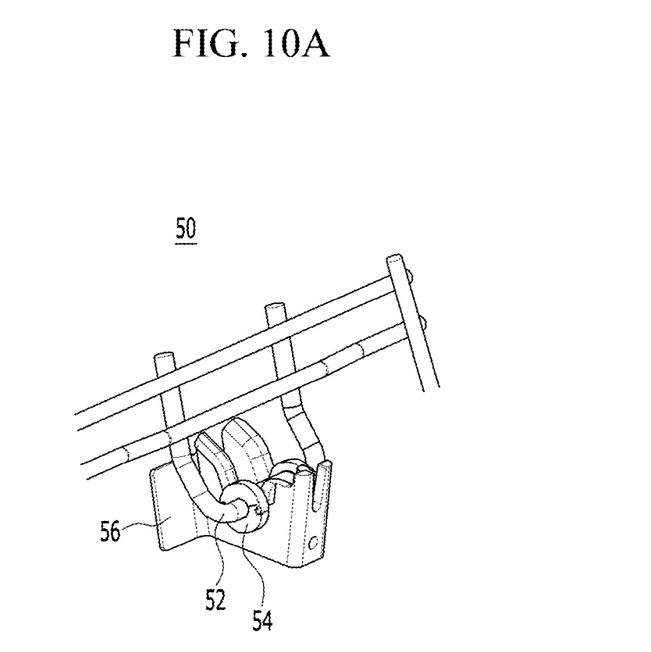
FIGS. 10A and 10B are views schematically showing the structure of a seat back hinge according to an exemplary embodiment of the present disclosure.
Figure 10B:
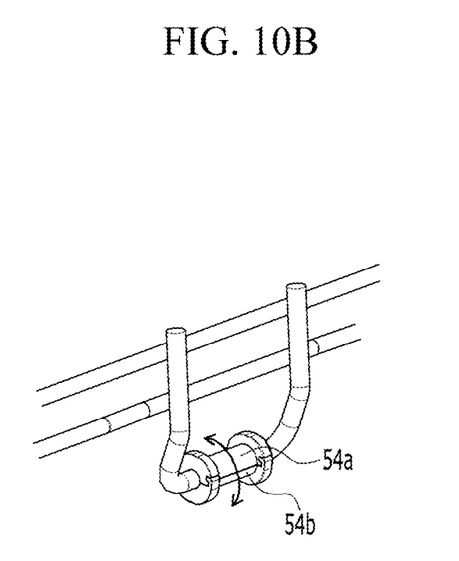

FIG. 2 is a diagram schematically showing an apparatus for adjusting a seat of a vehicle according to an exemplary embodiment of the present disclosure, FIG. 3 is a view schematically showing the structure of a seat back frame according to an exemplary embodiment of the present disclosure, FIG. 4 is a view schematically showing a motor driving unit and a bracket structure applied to a seat back frame according to an exemplary embodiment of the present disclosure, FIG. 5 is a diagram schematically showing a gear combination structure provided at a position facing the motor driving unit according to an exemplary embodiment of the present disclosure, FIG. 6 is a diagram schematically showing a gear combination structure of a motor drive unit according to an exemplary embodiment of the present disclosure, FIG. 7 is a view schematically showing a coupling structure of a bracket and a rail according to an exemplary embodiment of the present disclosure, FIG. 8 is a diagram schematically showing the structure of a seat back frame according to an exemplary embodiment of the present disclosure, FIG. 9 is a view schematically showing the structure of a cushion hinge according to an exemplary embodiment of the present disclosure, and FIGS. 10A and 10B are views schematically showing the structure of a seat back hinge according to an exemplary embodiment of the present disclosure.

First, referring to FIG. 2, an apparatus for adjusting seat of vehicle according to an exemplary embodiment of the present disclosure includes a seat back frame 10, a cushion frame 20, a cushion hinge part 40, and a seat back hinge part 50.

The seat back frame 10 is a frame of a vehicle body in which the back of a passenger is supported when seated on a vehicle seat, and the seat back frame 10 is supported and covered by a package tray.

The cushion frame 20 is a frame of a vehicle body in which a passenger's hip portion is supported when seated on a vehicle seat, and has a structure connected to the seat back frame 10. In addition, a motor driving unit 30 is provided outside the cushion frame 20, and the cushion frame 20 may be moved forward and backward by the operation of the motor driving unit 30.

The cushion hinge part 40 is located between the seat back frame 10 and the cushion frame 20, and may be provided on both sides of the rear seat. The cushion hinge part 40 connects the seat back frame 10 and the cushion frame 20, and may rotate according to the movement of the cushion frame 20 moved forward and backward by the operation of the motor driving unit 30 to adjust the angle of the seat back frame 10.

The seat back hinge part 50 is located on the upper side of the seat back frame 10, and may be provided on both sides of the rear seat. The seat back hinge part 50 connects the seat back frame 10 and the vehicle body, and may be rotated according to the movement of the seat back frame 10.

Meanwhile, as shown in FIG. 4 and FIG. 6, the motor drive unit 30 includes a worm gear 32 connected to the motor 31 and the shaft of the motor 31 to rotate, and a rack gear 33 that meshes with the worm gear 32 to convert the rotational motion of the worm gear 32 into a linear motion.

Further, the motor driving unit 30 may have a structure including a leg bracket 35, a motor bracket 36, and a guide bracket 39.

The leg bracket 35 is fixed to the vehicle body, and a first slot hole 34 penetrates through the side surface. In addition, the motor bracket 36 may be provided with a structure in which the motor 31 is coupled to the outer portion and covers the worm gear 32 and the rack gear 33. In addition, the guide bracket 39 is provided above the leg bracket 35 and formed through the second slot hole 37.

The slot pin 38 provided in the motor bracket 36 is inserted into the second slot hole 37, and as the motor bracket 36 moves, the slot pin 38 moves along the second slot hole 37 of the guide bracket 39. That is, by the drive of the motor 31, the shaft of the motor 31 rotates, and the worm gear 32 connected to the shaft of the motor 31 rotates. As the worm gear 32 rotates along the rack gear 33, the motor 31 and the motor bracket 36 perform linear motion. Accordingly, the motor bracket can be moved back and forth while the slot pin 38 of the motor bracket 36 is inserted into the second slot hole 37 of the guide bracket 39.

Meanwhile, the rack gear 32 may be fixed by welding to the upper end of the guide bracket 39. With this structure, the motor 31 and the motor bracket 36 can be moved together with the worm gear 32. The worm gear 32 meshes with the rack gear 33 so as to rotate relative to the guide bracket 39 to which the motor 31 and the motor bracket 36 are fixed as the worm gear 32 rotates.

Meanwhile, as shown in FIG. 2 and FIG. 3, the motor driving unit 30 may be located in the center of the side of the cushion frame 20, or may be located in front of the center or in front of the side of the cushion frame 20.

Meanwhile, as shown in FIG. 3, the cushion frame 20 may further include a frame shaft 22 connected to the shaft of the motor 31 and extending toward a position facing the motor bracket 36.

As shown in FIG. 4, the frame shaft 22 may be inserted into the first slot hole 34 formed on the side of the leg bracket 35 to move along with the motor bracket 36 along the first slot hole 34.

As shown in FIG. 5, the frame shaft 22 may be formed to extend toward an inner end of the vehicle facing the motor driving unit 30. A second worm gear 32' is provided at the inner end of the vehicle facing the shaft of the motor 31 of the frame shaft 22, and the worm gear 32' may be rotated by meshing with a second rack gear 33' converting the rotational motion of the worm gear 32' into a linear motion.

That is, the frame shaft 22 has a worm gear 32 connected to the shaft of the motor 31 and a second worm gear 32' provided at the inner end of the vehicle facing the shaft of the motor 31 at both ends. Each worm gear (32, 32') is rotated by meshing with each of the corresponding rack gears (33, 33'), the frame shaft 22, the motor bracket 36, and the cushion frame 20 can move linearly.

By the structure of the frame shaft 22 extending inward from the outside of the vehicle, twisting of the cushion frame 20 due to the difference in driving force inside/outside the vehicle is prevented, and smooth movement of the frame shaft 22 is possible.

As shown in FIG. 5, an end facing the shaft of the motor 31 is also provided with a bracket on the facing side corresponding to the motor bracket 36, and a second slot pin 38' formed in the bracket may be moved along a second slot hole 37' formed in the bracket on the opposite side corresponding to the guide bracket 39.

By applying the worm gears 32 and 32' and the rack gears 33 and 33' coupling structures to both ends of the frame shaft 22, the cushion frame 20 can stably and smoothly move back and forth. In addition, by transferring the driving force of the motor 31 from the outside of the seat to the inside, it is possible to prevent the left and right distortion of the cushion frame 20 due to the difference between the internal/external driving force.

Meanwhile, as shown in FIG. 7, the motor driving unit 30 may further include a rail 62 providing a path through which the motor bracket 36 is moved along the leg bracket 35. The leg bracket 35 may be fixed to the vehicle body. The leg bracket 35 is provided inside the leg bracket 35, and when the motor bracket 36 is moved by the driving of the motor 31, the motor bracket 36 may move relative to the leg bracket 35 along the path of the rail 62.

In this case, a bearing 64 may be provided between the motor bracket 36 and the rail 62. That is, the bearing 64 is placed between the lower outer portion of the motor bracket 36 and the inner portion of the rail 62, so that the motor bracket 36 can move smoothly along the rail 62.

Meanwhile, as shown in FIG. 8, the seat back frame 10 connects the seat back frame 10 and the cushion frame 20, and includes a cushion hinge part (A, 40) for adjusting the angle of the seat back frame 10 by rotating according to the movement of the cushion frame 20, and a seat back hinge part (B, 50) that connects the seat back frame 10 and the vehicle body and rotates according to the movement of the seat back frame 10.

As shown in FIG. 9, the cushion hinge part 40 includes a cushion bracket 42 and a seat back bracket 44. The cushion bracket 42 may be provided to surround the cushion frame 20 so that the cushion frame 20 rotates. In addition, the cushion bracket 42 may further include a cushion bush 47 that is fixedly coupled to the cushion frame 20 and rotates with the rotation of the cushion frame 20. The seat back bracket 44 connects the cushion bracket 42 and the seat back frame 10. In addition, the cushion bracket 42 and the seat back bracket 44 may be hingedly coupled by a pin 46.

Meanwhile, as shown in FIGS. 10A and 10B, the seat back hinge part 50 includes a seat back wire 52, a seat back bush 54, and a hook 56.

The seat back bush 54 may be provided to surround the seat back wire 52, and when the seat back frame 10 is rotated, the seat back bush 54 together with the seat back wire 52 may be rotated. The seat back bush 54 may be formed of a plastic material.

The seat back bush 54 may include a first seat back bush 54*a* and a second seat back bush 54*b* coupled to each other so as to surround the seat back wire 52.

The hook 56 may be welded to the vehicle body and may serve to support the seat back bush 54. The hook 56 may be formed of a steel material.

As described above, according to an exemplary embodiment of the present disclosure, by providing a vehicle seat adjustment device with a simple structure equipped with a motor drive unit in the vehicle's cushion frame and a hinge structure applied to the cushion frame and seat back frame, cost and weight can be reduced compared to the existing reclining structure.

In addition, since the seat back angle can be adjusted, it is possible to implement a comfortable seating posture for passengers during long-distance driving, so customer satisfaction can be improved.

In addition, by applying a seat bag that can be rotated according to the movement of a cushion frame instead of a fixed seat bag in a mid-sized sedan to adjust the angle, marketability can be increased by implementing a seat back angle adjustment function for the first time in a mid-sized sedan.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. An apparatus for adjusting a seat of a vehicle, comprising:
a seat back frame;
a cushion frame that is moved forward and backward by a motor driving unit;
a cushion hinge part connecting the seat back frame and the cushion frame, the cushion hinge part being configured to rotate according to the movement of the cushion frame to adjust an angle of the seat back frame; and
a seat back hinge part connecting the seat back frame and a vehicle body, the seat back hinge part being configured to rotate according to the movement of the seat back frame;
wherein the motor driving unit includes:
a motor;
a worm gear connected to a motor shaft and rotated;
a rack gear meshed with the worm gear to convert rotational motion of the worm gear into linear motion;
a leg bracket formed by penetrating a first slot hole on a side surface;
a motor bracket coupled to an outer portion of the motor and covering the worm gear and the rack gear; and
a guide bracket provided above the leg bracket, formed through a second slot hole, and inserted onto a slot pin of the motor bracket to move the motor bracket.

2. The apparatus for adjusting a seat of a vehicle of claim 1, wherein the rack gear is fixed by welding to the upper end of the guide bracket.

3. The apparatus for adjusting a seat of a vehicle of claim 1, wherein the cushion frame is connected to the motor shaft, the cushion frame extends toward an inner end of the vehicle facing the motor bracket, and further includes a frame shaft that is inserted and moved into the first slot hole.

4. The apparatus for adjusting a seat of a vehicle of claim 3, wherein the worm gear is provided at an inner end of the vehicle facing the motor shaft of the frame shaft, and the worm gear is rotated by meshing with a rack gear that converts rotational motion of the worm gear into linear motion.

5. The apparatus for adjusting a seat of a vehicle of claim 1, wherein the motor driving unit further includes a rail providing a path through which the motor bracket is moved along the leg bracket.

6. The apparatus for adjusting a seat of a vehicle of claim 5, wherein a bearing is posted and coupled between a lower outer portion of the motor bracket and an inner portion of a rail.

7. The apparatus for adjusting a seat of a vehicle of claim 1, wherein the leg bracket is welded to the vehicle body to support a lower end of the cushion frame.

8. An apparatus for adjusting a seat of a vehicle, comprising:
a seat back frame,
a cushion frame that is moved forward and backward by a motor driving unit;
a cushion hinge part connecting the seat back frame and the cushion frame, the cushion hinge part being configured to rotate according to the movement of the cushion frame to adjust an angle of the seat back frame, and
a seat back hinge part connecting the seat back frame and a vehicle body, the seat back hinge part being configured to rotate according to the movement of the seat back frame,
wherein the cushion hinge part includes:
a cushion bracket surrounding the cushion frame so that the cushion frame is rotated;
a seat back bracket connecting the cushion bracket and the seat back frame; and
a cushion bush provided inside the cushion bracket and rotated with the rotation of the cushion frame.

9. The apparatus for adjusting a seat of a vehicle of claim 8, wherein the cushion bracket is hingedly coupled to the seat back bracket by a pin.

10. An apparatus for adjusting a seat of a vehicle, comprising:
a seat back frame;
a cushion frame that is moved forward and backward by a motor driving unit a cushion hinge part connecting the seat back frame and the cushion frame, the cushion hinge part being configured to rotate according to the movement of the cushion frame to adjust an angle of the seat back frame; and
a seat back hinge part connecting the seat back frame and a vehicle body, the seat back hinge part being configured to rotate according to the movement of the seat back frame;
wherein the seat back hinge part includes:
a seat back wire;
a seat back bush that surrounds the seat back wire so that the seat back wire rotates; and
a hook fixed to the vehicle body and supporting the seat back bush.

11. The apparatus for adjusting a seat of a vehicle of claim 10, wherein the hook is formed of a steel material, and the seat back bush is formed of a plastic material.

12. The apparatus for adjusting a seat of a vehicle of claim 11, wherein the seat back bush includes a first seat back bush and a second seat back bush that are coupled to each other to surround the seat back wire.

* * * * *